United States Patent [19]
Williams

[11] Patent Number: 5,759,311
[45] Date of Patent: Jun. 2, 1998

[54] LOW NOISE TIRE TREAD

[75] Inventor: Thomas A. Williams, North Canton, Ohio

[73] Assignee: Hankook Tire Mfg. Co., Ltd., Seoul, Rep. of Korea

[21] Appl. No.: 660,800

[22] Filed: Jun. 6, 1996

[51] Int. Cl.⁶ .......................... B60C 11/11; B60C 113/00
[52] U.S. Cl. ........................... 152/209 A; 152/209 R
[58] Field of Search ................... 152/209 R, 209 A, 152/209 D

[56] References Cited

U.S. PATENT DOCUMENTS

| | | |
|---|---|---|
| D. 340,893 | 11/1993 | Kobayashi et al. ............ D12/147 |
| 1,956,011 | 4/1934 | Evans ........................ 152/209 R |
| 2,006,197 | 6/1935 | Ewart et al. . |
| 2,124,821 | 7/1938 | Hubach . |
| 2,612,928 | 10/1952 | Buddenhagen . |
| 2,878,852 | 3/1959 | Lippmann et al. . |
| 3,217,776 | 11/1965 | Ellenrieder et al. ........... 152/209 A |
| 3,989,780 | 11/1976 | Vorih . |
| 4,178,199 | 12/1979 | Lippman . |
| 4,327,792 | 5/1982 | Landers . |
| 4,416,316 | 11/1983 | Clatworthy et al. . |
| 4,598,748 | 7/1986 | Campos et al. . |
| 4,667,718 | 5/1987 | Fontaine ..................... 152/209 R |
| 4,777,993 | 10/1988 | Yamashita et al. . |
| 5,209,793 | 5/1993 | Cusimano, II . |
| 5,309,965 | 5/1994 | Williams . |
| 5,314,551 | 5/1994 | Williams . |
| 5,371,685 | 12/1994 | Bandel et al. . |
| 5,372,171 | 12/1994 | Miyazaki et al. ............. 152/209 A |
| 5,383,506 | 1/1995 | Kogure . |
| 5,394,916 | 3/1995 | Williams . |
| 5,472,030 | 12/1995 | Shibata et al. . |

FOREIGN PATENT DOCUMENTS

| | | | |
|---|---|---|---|
| 370699 | 5/1990 | European Pat. Off. ....... 152/209 A |
| 0 524 568 B1 | 1/1993 | European Pat. Off. . |
| 0 688 684 A2 | 12/1995 | European Pat. Off. . |
| 178019 | 7/1993 | Japan ....................... 152/209 D |

*Primary Examiner*—Steven D. Maki
*Attorney, Agent, or Firm*—Hudak & Shunk Co., L.P.A.

[57] ABSTRACT

A low noise tire tread includes a base pitch sequence circumferentially extending about at least a portion of the tire. A bias pitch sequence is embedded within at least one of the base pitches and desirably in a majority of, or preferably in each base pitch. The bias pitches extend generally at a lateral angle with respect to the circumferential base pitch and desirably extends across the full tread arc. One or more bias pitch sequences have different lateral pitch locations than the pitch locations of another bias pitch sequence.

4 Claims, 3 Drawing Sheets

LOW NOISE TIRE TREAD

FIELD OF THE INVENTION

The present invention relates to a reduced noise tire tread. More specifically, the present invention relates to a tire tread with a bias pitch sequence being embedded within one or more pitches of a circumferential or base pitch sequence.

BACKGROUND OF THE INVENTION

The tread of a modern tire is typically divided into a plurality of raised, load-supporting tread blocks separated by intersecting circumferential and transverse grooves. The shape, configuration and arrangement of the tread blocks contribute to the control, acceleration and braking characteristics of the tire, while the grooves are necessary to provide flexibility and water removal.

The tread blocks are typically arranged in "base pitches," wherein each base pitch includes a predetermined geometry of tread blocks. Each base pitch may vary in width across the tire. For example, each base pitch may extend transversely from one shoulder to the other shoulder of the tire, or it may extend transversely over only a single circumferential section of the tire, for example over a single rib or combination of ribs. In any case, the base pitches are repeated around the circumference of the tire to form the tire tread.

The running contact of the tire tread on the road surface tends to produce unwanted noise. In particular, as the tire contacts the road surface, the individual tread blocks cause air disturbances upon impact with the road, creating a spectrum of audio frequencies broadly referred to as "tire noise." Tire noise is generated at least in part by: (1) the impact of the tread block on the road surface; (2) the vibration of the tire carcass; and (3) the "air pumping" which occurs as the tread blocks become compressed and expand into the grooves separating adjacent blocks. The fundamental frequency of the noise is a function of the number of tread blocks around the circumference of the tire and the rotational speed of the tire.

Techniques have been developed to distribute the noise frequency produced by the tire tread over a wide frequency band to approach what is termed "white noise." One known technique for reducing tread noise is to use base pitches having different pitch lengths, wherein the "pitch length" is a measure of the length from the leading edge of one base pitch to the leading edge of the next adjacent representative base pitch in the circumferential direction of the tire. A plurality of base pitches having different pitch lengths is conventionally referred to as a "pitch sequence."

For example, Lippman et al. U.S. Pat. No. 2,878,852 discloses a tire tread having male and female mold halves, wherein each mold half has a separate pitch sequence extending around the circumference of the tire. Lippman discloses a pitch sequence which is represented by the series of relative circumferential distances: 9 10 11 12 10 11 12 13 12 11 10 9 11 12 13 10 10 13 12 11 9 10 11 12 13 12 11 10 12 11 10 9. These circumferential distances represent the relative circumferential length of successive tread units expressed in any desired measuring unit. In Lippman the tread units are selected to be mirror images of themselves or of other grooves in each respective mold half.

Landers, U.S. Pat. No. 4,474,223, discloses a method for reducing tire noise by spreading the noise generated by the tire tread over a broad frequency spectrum by:

i. selecting the maximum number of repeating design cycles which may be placed about the apparatus;

ii. selecting a maximum pitch ratio;

iii. determining the appropriate number of harmonic segments in which the apparatus may be divided into in accordance with the following equation:

$$NS=[NPx(LP-SP)]/[Bx(LP+SP)]$$

where

NS is the required number of harmonic sequence
NP is the number of pitches (design cycles)
LP is the longest pitch length
SP is the shortest pitch length
B is the modulation index;

iv. determining the size of each of the harmonic segments and the number of design cycles for each of the harmonic segments; and v. arranging the different design cycle lengths in each of the harmonic segments so that the wave length of the predominant modulation frequency of the harmonic segment corresponds to the fundamental length of that segment.

Williams, U.S. Pat. No. 5,314,551, relates to a tire with reduced tire noise, including a tread having a plurality of base pitches placed about the circumference of the tire in at least one circumferential section. According to one aspect of the invention, the base pitches have three different pitch lengths which form a pitch sequence around the circumference of the tire in each circumferential section. The base pitches are arranged such that the transitions between the base pitches with the smallest pitch lengths to the base pitches with the largest pitch lengths are between about 15 percent and 30 percent of the total number of transitions between base pitches of different lengths in the pitch sequence. Additionally, the smallest and largest base pitches each comprise between about 35 percent and 40 percent of the total number of base pitches around the circumference of the tire.

European Patent No. 524,568 relates to a tread of a pneumatic tire having an asymmetric tread with two distinct sets of angularly orientated pitches. However, the base sequence does not have any bias pitch sequence embedded therein.

SUMMARY OF THE INVENTION

A tire tread having reduced noise contains at least one base pitch sequence in a circumferential direction about a tire. A second pitch sequence is embedded within at least one pitch of the base sequence at generally a lateral angle (e.g. bias). The embedded bias pitch sequence desirably extends across the full arc of the tire tread and has different length pitches. Moreover, one or more adjacent bias pitch sequences, each embedded within a different base pitch, generally have one or more different lateral pitch locations with respect to each sequence.

DETAILED DESCRIPTION OF THE PREFERRED EMBODIMENT

Figure 1:
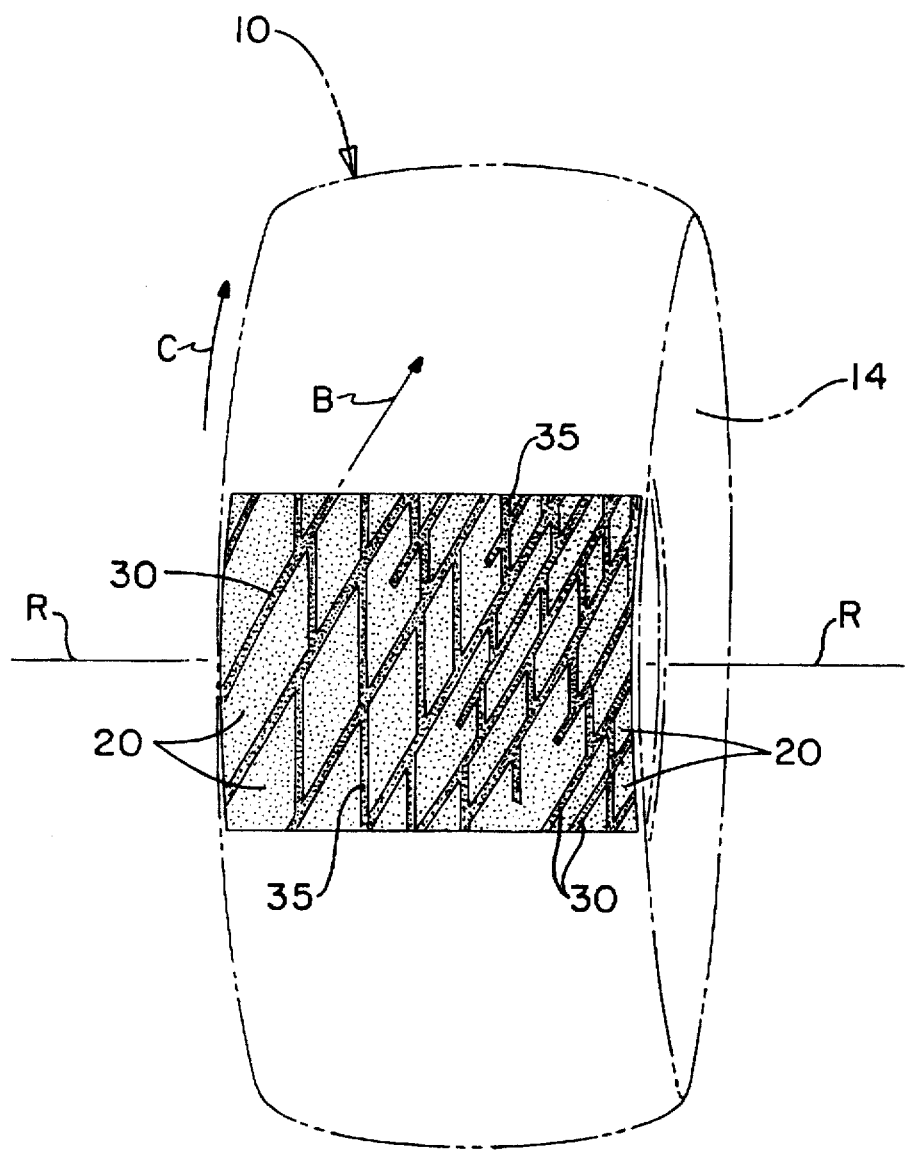
FIG. 1 is a perspective view of a tire having a low noise tread made in accordance with the present invention.

Referring to the drawings, and specifically FIG. 1, a tire, generally indicated by the numeral 10, has a side wall 14 and rotates about an axis R. The tire can be any conventional tire such as a bias ply tire, and is preferably a radially ply tire, but is not limited thereto. In general, the invention relates to any type of tire having a tread thereon containing a plurality of tread blocks 20. The manufacture of tire 10 is known to the art and thus will not be discussed herein.

Figure 2:
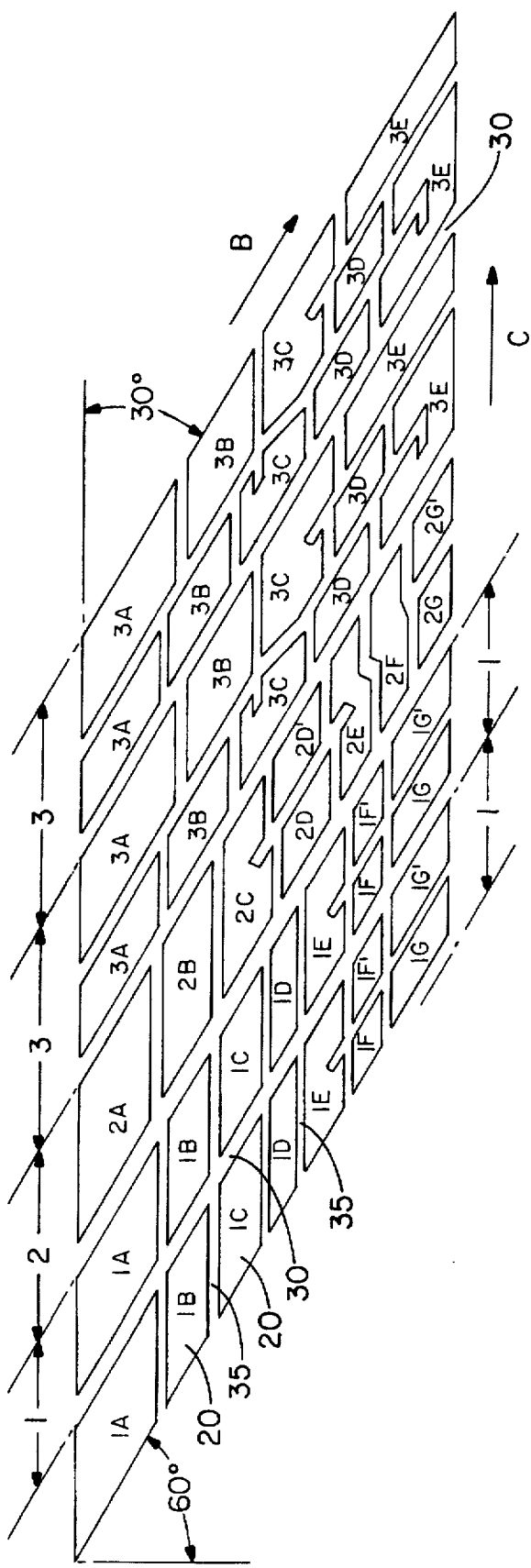
FIG. 2 is a partial plan view showing a tread block pattern of the present invention.

FIG. 2 shows a portion of particular low noise tread pattern in accordance with the present invention. The tread extends in a circumferential direction, indicated by "C," around the tire and includes a plurality of base pitches, for example 1,1,2,3,3, etc. as shown in FIG. 2. A base pitch is often defined as a single tread block which can be repeated about the circumference of the tire. In other words, it is the smallest geometric unit that can be duplicated to create the entire tire tread. The base pitch length is generally defined as the distance from the leading edge of a pitch or a tread block to the leading edge of an adjacent pitch or tread block in the circumferential direction. As shown in FIG. 2, a plurality of adjacent base pitches form a sequence. In order to reduce tire noise, each of the base pitches shown, i.e. 1, 2, and 3 have a different base pitch length. For example, the circumferential pitch length containing tread block 1A can be a unit distance of 1 whereas the pitch length containing tread block 2A is a unit distance of 1.2, and the total pitch length containing tread blocks 3A and 3B is a unit distance of 1.45. Hence, in the preferred embodiment of the present invention shown in FIG. 2, the base pitch ratio of the largest pitch length to the smallest base pitch length is about 1.45 to 1.0.

As well known to those skilled in the art, a tire tread can have a plurality of circumferential base pitch sequences about the tire. While any sequence can exist with regard to the present invention, a preferred base pitch sequence is 1 1 3 1 2 1 2 1 3 2 3 3 3 3 1 1 2 3 3 3 2 1 1. Naturally, different base pitch sequences can exist utilizing anywhere from 2 to about 5, 7 or 10 different base pitches with 3 being preferred.

Although grooves 30 are often located between individual base pitches and extend in a bias direction as shown in FIG. 2, for example, between tread blocks 1A and 2A, they can be located anywhere within a base pitch length, e.g., within the center portion thereof as in pitch 3 (See FIG. 2). The various grooves need not be continuous but can be sipes. Such grooves can be curvilinear, extend laterally only a part way of the tread, be located in a particular lateral portion of the tread as for example, the center portion, and the like. Preferably bias grooves 30 are linear, extend the full lateral length of the tread, and are located between the circumferential ends of the base pitches, e.g., tread blocks 20.

Tire noise is further reduced or abated by the utilization of a bias pitch sequence. That is, at least one, desirably a majority, e.g. 60 percent, 70 percent, 80 percent or 90 percent, and typically each base pitch has a bias pitch sequence embedded therein. By "embedded," is meant that as an integral part of a particular base pitch, another pitch sequence extends therefrom in a second or bias direction across the tread. Each particular base pitch generally has a different bias pitch sequence embedded therein. Thus, the bias pitch sequence embedded in each type of base pitch is desirably the same. Hence, a "1" base pitch has a specific bias pitch sequence embedded therein and other "1" base pitches have the same corresponding bias pitch sequence embedded therein. The same is generally true with regard to a "2" base pitch, a "3" base pitch, etc., with each different base pitch, "2", "3", etc., as noted, independently having a different bias pitch sequence embedded therein. Since a particular base sequence has a bias pitch sequence embedded therein containing a plurality of pitches, a different base pitch having a different bias pitch sequence therein will have one or more particular bias pitches located in a different lateral location. Although the bias pitch sequence can extend a substantial or a majority portion (for example, a 70 or 75 percent, at least 80 or 85 percent, or at least 90 or 95 percent) of the tread arc, that is the distance from one tire shoulder such as the outside tire shoulder to the other tire shoulder or inside tire shoulder, it preferably extends the full arc or lateral width of the tire.

The pitch sequence can have many shapes such as curvilinear, contain a change of direction, i.e. an inflection point such as a "V" shape or "v" shape sequence, etc., but preferably is linear. Generally, circumferential grooves 35 can be located within any lateral portion of a specific bias pitch such as in the center, or near one end thereof, but preferably are located between one or more bias pitches. The direction of at least the initial bias pitch sequence and preferably the entire bias pitch sequence is a lateral angle, that is, an angle from a lateral line across the tread of from about 0° or 5° to about 80°, desirably from about 20° to about 70°, and preferably from about 40° to about 65°, with approximately 60° being highly preferred. An advantage of a bias pitch angle is that the tread blocks which desirably exist between the bias grooves 30 and the various circumferential grooves 35 generally do not contact the road at substantially the same time and thus abate tire tread noise.

Desirably, a plurality of generally different bias pitches of 3 or more, desirably from 4 to about 15, and preferably from about 5 to 8 extend across the lateral or axial width of the tire in bias direction B. Thus, the ratio of the number of pitches in a bias pitch sequence to the number of pitches in the base pitch sequence is generally greater than 1. In the embodiment shown in FIG. 2, the pitch bias sequence embedded within circumferential base pitch containing tread block 1A is 7. Similarly, the number of bias pitches of the sequence embedded within the base pitch containing base tread block 2A is also 7. The number of bias pitches of the sequence embedded within the base pitch containing base tread block 3A or 3B is 5. As shown, the bias pitch lengths of a particular sequence can vary in size from shoulder to shoulder with generally the bias pitches of the outside tire shoulder being larger than pitch lengths of the pitches located on the inside tire shoulder as in a high performance or racing tire. However, any variation of bias pitch lengths in a sequence can be utilized and thus in an all season tire, the inside and outside shoulders can, for example, contain large bias pitch lengths and the center portion of the tire tread contains smaller pitch lengths.

As noted above, different bias pitch sequences can have one or more, a majority, or all specific pitches located at a different lateral location than the pitches of one or more other or adjacent bias pitch sequences. Thus, in the embodiment of FIG. 2, the lateral location of each pitch in bias sequence 1 is located at a different lateral location than each pitch of the bias pitch sequence embedded within base pitch 2. Similarly, each bias pitch length of the bias pitch sequence embedded within base sequence 3 is located at a different lateral location than any particular pitch of the bias pitch sequence embedded within base pitch 2. Accordingly, no tread blocks 1A, 1B, 1C, 1D, 1E, 1F, or 1G are located at the same lateral location as any of the tread blocks 2A, 2B, 2C, 2D, 2E, 2F, or 2G. Also, none of the tread blocks of the third bias pitch sequence 3A, 3B, 3C, 3D, or 3E are located at the same lateral position as any of the particular tread blocks of the second bias pitch sequence. Such arrangement also results in reduced tire tread noise. However, it is to be understood that only one or more particular pitches of a specific bias pitch sequence need be located at a different lateral location than the corresponding pitches of another or adjacent bias pitch sequence. It should thus be apparent that the utilization of a base pitch sequence containing a bias pitch sequence embedded therein can include a very large number of tire tread patterns, all within the concepts of the present invention.

In a preferred embodiment of the present invention as shown in FIG. 2, wherein bias grooves 30 are substantially linear and extend the full lateral width of the tire, not only is tread noise reduced, but water is effectively channeled through the various tread blocks. Moreover, the provision of various different bias pitch sequences having one or more and typical several different circumferential grooves located at different lateral locations results in the present invention lacking or being free of one or more circumferential grooves located at a specific lateral distance from a tire tread shoulder and extending completely about the tire. Another aspect of the present invention is that unlike most conventional tires, a plurality of bias pitch lengths or bias tread blocks are generally not symmetrical. Still another aspect is that various bias pitches, such as on the inside of the tire, can be subdivided into two or more pitches, for example, pitches 1G and 1G', 2D and 2D', and 2G and 2G'.

A tire containing three different circumferential base pitches and a total of 23 pitches in a sequence as set forth herein above was made with each of the three different base pitches having embedded therein a full arc bias pitch sequence as shown in the drawings. The first test was an objective test utilizing a semi-anechoic chamber. That is, the floor of the chamber had no noise treatment attached thereto, but the walls and ceiling had very large foam wedges attached thereto. These wedges effectively trapped the noise being generated in the room and did not allow any reflections of sound. An accurate measurement of sound being generated is thus obtained. A P245/45R16 tire containing the above-noted preferred tread pattern of the present invention (i.e., base pitch sequence, bias pitch sequence, etc., as shown in FIG. 2) and a bias pitch angle of 60° was inflated to a test pressure and placed on a test drum. A load was applied to the test drum and the drum was rotated at various speeds while measurements were being taken. The load itself was generally about 547 kgf at a pressure of 2.0 kgf/cm² at speeds of from 40 to 120 kph. The drum surface was smooth steel. As a control, a production Hankook Ventus Plus 405 ultra-high performance tire was utilized. The results are set forth in FIG. 3.

Figure 3:
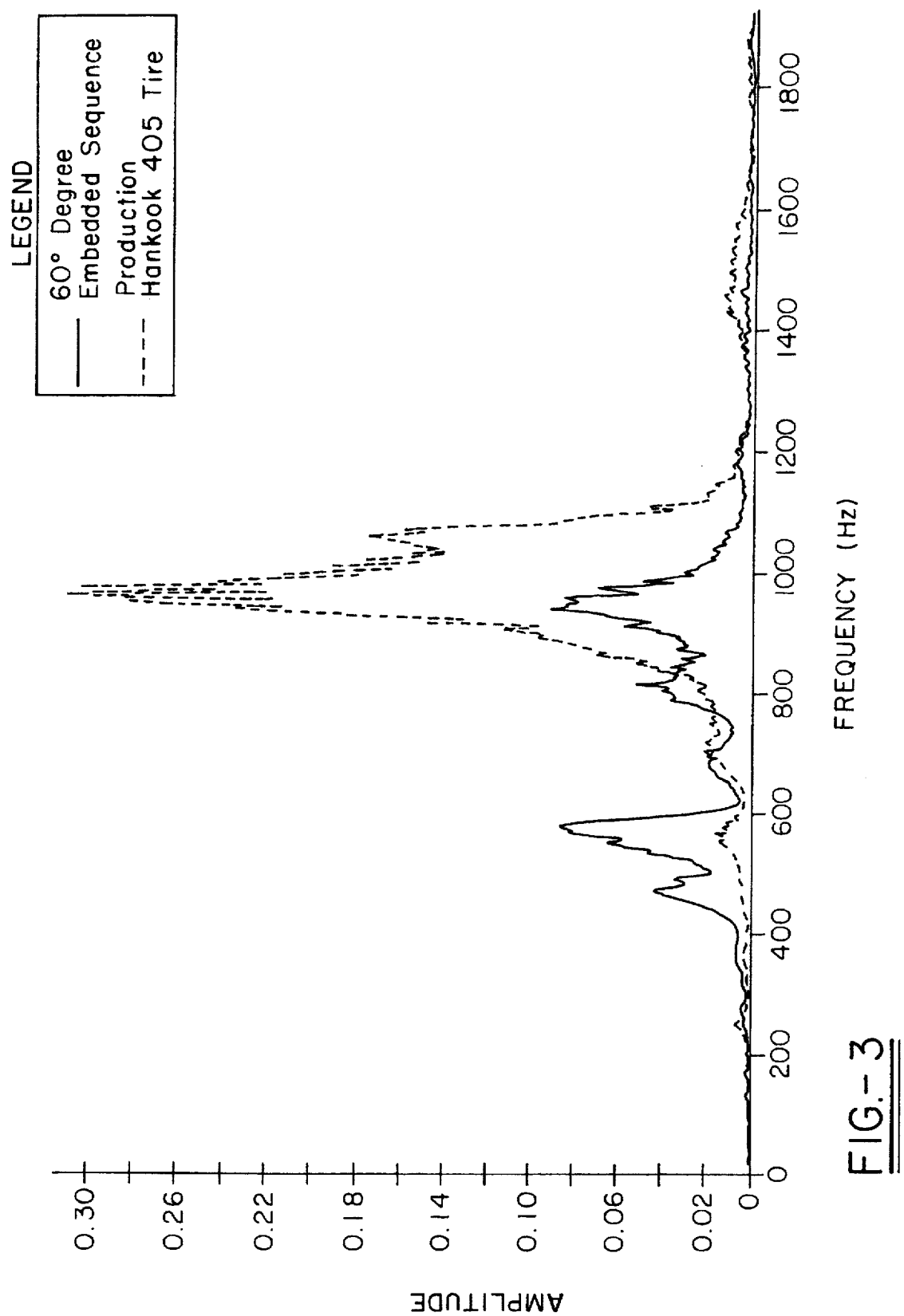
FIG. 3 is a graph showing the amplitude of the noise of a tire tread according to the present invention in comparison with a control tire tread.

As apparent from FIG. 3, the results of the tread design on the present invention resulted in a much lower amplitude noise level at approximately 1,000 hertz, and generally over a wider frequency. The net result, of course, was a reduced noise level.

Various tires were tested for noise levels with respect to low speed, high speed and growl utilizing an SAE subjective test. The control was a Hankook Ventus Plus 405 ultra-high performance tire. In Table I, the column "no embedded bias pitch" contained no embedded pitch sequence therein and thus also served as a control. A high performance tire produced in accordance with the present invention as noted above having an embedded pitch sequence therein as shown in the drawings was also tested.

TABLE I

| NOISE | HANKOOK 405 (Control) | 50 DEGREES NO EMBEDDED BIAS PITCH (Control) | 50 DEGREES CONTAINING AN EMBEDDED BIAS PITCH |
|---|---|---|---|
| Low Speed | 5.0 | 5.5 | 6.0 |
| High Speed | 5.5 | 5.5 | 6.0 |
| Growl | 5.0 | 6.0 | 6.5 |

The numbers of Table I are according to the SAE subjective scale rating with higher numbers indicating lower noise levels.

As apparent from Table I, the embedded bias pitch sequence tire of the present invention gave higher values than the controls. A full unit, i.e. a value of 1.0, indicates a significantly reduced noise level. Thus, tires of the present invention containing a bias pitch sequence embedded within each base pitch gave notably reduced noise levels.

While in accordance with the Patent Statutes, a preferred embodiment and best mode has been presented, the scope of the invention is not limited thereto, but rather is measured by the scope of the attached claims.

What is claimed is:

1. A low noise tire, comprising;
   a tread portion having a first shoulder tread portion and a laterally opposing second shoulder tread portion and a circumferential base pitch sequence including base pitches, a plurality of different bias pitch sequences, each base pitch having one of the bias pitch sequences embedded therein, each bias pitch sequence extending a substantial lateral width of said tread portion, said bias pitch sequences having larger pitches on said first shoulder tread portion of the tire than on said second shoulder tread portion of the tire, at least one of said bias pitch sequences including circumferentially spaced bias pitches of different shapes on said second shoulder tread portion, and substantially linear and parallel grooves between adjacent bias pitch sequences, said linear and parallel grooves extending substantially across the lateral width of said tread portion.

2. A low noise tire according to claim 1, wherein said different basis pitch sequences extend across at least 90 percent of a full tread arc and, independently, have from 3 to about 15 pitches therein.

3. A low noise tire according to claim 2, wherein said bias pitch sequences extend at a lateral angle of from about 20° to about 70° with respect to a lateral line across the tread portion.

4. A low noise tire according to claim 3, wherein said bias pitch sequences extend across a full tread arc.

* * * * *